United States Patent Office 3,379,549
Patented Apr. 23, 1968

3,379,549
COMPOSITION FOR RESTORING
SURFACE FINISHES
Malcolm L. Playfair, Portland, Oreg., assignor to Don Hall Laboratories, Inc., Portland, Oreg., a corporation of Oregon
No Drawing. Continuation-in-part of application Ser. No. 436,367, Mar. 1, 1965. This application Sept. 9, 1966, Ser. No. 578,148
3 Claims. (Cl. 106—265)

ABSTRACT OF THE DISCLOSURE

A substantially anhydrous liquid composition having a flash point exceeding 70° F. and consisting essentially of about 25 to 75 parts by volume volatile coating solvent which consists essentially of a mixture of about 55 to 80 parts by volume flammable solvent and about 20 to 45 parts by volume substantially non-flammable solvent, in admixture with about 75 to 25 parts by volume non-volatile liquid vehicle, functions to restore surface coatings of nitrocellulous lacquers and modified or unmodified drying oil varnishes by softening such coatings sufficiently to redistribute the latter to fill in and otherwise repair scratches and otherwise damaged or marred areas of the surface coating.

This invention relates to finish restorers, and more particularly to a composition for use in restoring surface coatings of nitrocellulose lacquers and modified or unmodified drying oil varnishes which have been damaged or marred by scratches, heat rings, water rings, alcohol marks and the like.

This application is a continuation-in-part of my abandoned earlier application filed Mar. 1, 1965 under Ser. No. 436,367.

Various compositions have been provided heretofore for the purpose of restoring finishes to their original condition. However, the use of such compositions has been attended by certain disadvantages, principal among which are the following: The use of many such compositions requires a degree of skill beyond the capabilities of the average householder. In addition, all of such compositions are highly flammable and therefore hazardous to store and use.

Accordingly, it is the principal object of the present invention to provide a composition of the class described, the use of which does not require special skills beyond the capability of the average householder to effect restoration of the surface coating to its original condition.

Another important object of this invention is the provision of a compostion of the class described, which is substantially non-flammable and thus presents no hazard in storage and use.

A further important object of this invention is the provision of a composition of the class described which is inexpensive, easy to apply and highly effective.

The foregoing and other objects and advantages will appear from the following detailed description.

The composition of this invention has utility in restoring the surface finish of surface coatings of those types of nitrocellulous lacquers and modified or unmodified drying oil varnishes which include and are applied from a volatile organic solvent vehicle, which harden under normal atmospheric conditions, and whose hardened films are capable of being at least partially dissolved or softened by oragnic solvents.

Basically, the composition of the present invention involves the incorporation with a substantially non-volatile liquid vehicle, in which the surface coating is insoluble, of a mixture of flammable and substantially non-flammable volatile liquid solvents in such proportion that the mean evaporation rate of the solvent mixture produces vapors which are substantially self-extinguishing.

There are many mixtures containing flammable solvents which have been used heretofore for restoring surface coatings of the types described hereinbefore, and all of such solvents may be utilized in the composition of this invention. These solvents are xylene, toluene, isopropyl alcohol, butyl alcohol, acetone, cellosolve, methyl cellosolve, butyl cellosolve, butyl acetate, amyl acetate, ethyl acetate, methyl ethyl ketone and methyl isobutyl ketone. These flammable solvents may be employed in any desired combination of two or more. Other flammable solvents also may be used if desired, but it is important in such event that two or more of the flammable solvents listed above be included therewith as the essential flammable solvent compound of the solvent mixture.

The aforementioned flammable solvents constitute the primary solvents for the surface which is to be repaired. The removal of blemishes, scratches and other defects in the surface coating is believed to be effected by partially dissolving or softening the hardened surface coating in the area of the blemish and mechanically redistributing the dissolved or softened coating so as to fill in scratches and remove undesirable colorings. In some instances of excessive damage it may also be desirable to incorporate dyes or pigments in the composition to assist in the restoration of the original color.

The substantially non-flammable volatile component of the volatile solvent mixture functions primarily to modify the flammability of the primary solvent. Whereas conventional film restorers are characterized by having a flash point of around 30° F., it is an important feature of the present invention that the flash point of the solvent mixture, and hence the final composition, is at least 70° F., preferably in excess of 100° F. This is achieved by proportioning the solvent mixture to include about 55 to 80 parts by volume of flammable solvent component and about 20 to 45 parts by volume of the substantially nonflammable solvent component. Within these proportions the solvent mixture is characterized by having a mean evaporation rate such that the vapors emanating from the surface of the solvent are substantially self-extinguishing.

Exemplary of the many non-flammable solvents suitable for the composition of this invention are methyl bromide, ethyl bromide, methylene chloride, chlorethene, trichlorethylene, chloroform, carbon tetrachloride, and other chlorinated or brominated liquid aliphatic hydrocarbons which are liquid at normal atmospheric conditions and whose vapors have flame-retardant properties. It is understood, of course, that this solvent component must be miscible in the final composition mixture.

The substantially non-flammable component of the solvent mixture may function secondarily as a solvent for the surface coating. In this regard it has been found that application of the composition is rendered faster and with much less effort, and results in higher gloss to the restored finish, than with compositions in which the non-flammable solvent component is absent.

The volatile solvent mixture is combined with a non-volatile liquid vehicle in which the surface coating is insoluble. Suitable vehicles for this purpose are the petroleum base oils having a viscosity not exceeding SAE 60. Of these the preferred oil is conventional motor lubricating oil having a viscosity of SAE 40. Other suitable vehicles are the modified or unmodified vegetable oils, such as linseed, tung or china wood, and many others. In this class the preferred vehicle is unmodified tung or china wood oil. Combinations of these various oils also may be employed. The vehicle functions to modify the solvent action of the solvent mixture on the surface coating to be repaired. It also serves as a carrier for dyes and pigments, and it contributes to the ultimate sheen of the repaired coating.

The volatile solvent mixture and non-volatile vehicle are combined in proportions of about 25 to 75 parts by volume of solvent mixture and 75 to 25 parts by volume of vehicle. It has been found that if less than about 25 parts vehicle is employed, the dissolution of the hardened surface coating cannot adequately be controlled, resulting in substantial stripping of the surface coating. On the other hand, if more than about 75 parts vehicle is employed the solvent action of the solvent mixture is reduced to an impracticable degree. It has been found that approximately equal parts of solvent mixture and vehicle provide the composition with characteristics most suitable for household use.

It is important in the present invention that the final composition be substantially anhydrous, i.e. it must contain less than 0.5% water. This is necessary in order to prevent the formation of acids which otherwise would develop by reaction of water with the chlorinated or brominated solvent component. Since the major source of water is found in the flammable solvent component, it is desirable to dehydrate this component, if necessary, before mixing it with the other components of the final composition.

The following are typical examples of compositions embodying the present invention:

Example I

The solvent mixture was prepared by combining, in parts by volume, 69 parts of a flammable solvent mixture consisting of 30 parts xylene, 22 parts toluene, 7 parts butyl acetate, 7 parts ethyl acetate and 3 parts amyl acetate, and 31 parts of a non-flammable solvent mixture consisting of 22 parts methylene chloride and 9 parts chlorethene. The flammable solvent mixture was suitably dehydrated to provide the final composition with less than 0.5% water.

Equal parts of the above solvent mixture and SAE 40 motor oil then were combined, and a sufficient amount of oil soluble dye or pigment added to provide coloring compatible to the surface coloring to be repaired.

This composition has a flash point of over 150° F. It may be applied with a cloth pad or very fine steel wool, employing very light pressure, and results in almost instantaneous visible disappearance of superficial scratches, heat rings, alcohol rings and other similar blemishes from surface coatings of the hereindescribed types.

Example II

The solvent mixture was prepared by combining, in parts by volume, 60 parts of the dehydrated flammable solvent mixture of Example I, namely about 26 parts xylene, 19 parts toluene, 6 parts butyl actate, 6 parts ethyl acetate and 3 parts amyl acetate, 30 parts of a non-flammable solvent mixture consisting of 25 parts methylene chloride and 5 parts chlorethene, and 10 parts of a petroleum aliphatic solvent fraction having a distillation range from about 300 to about 360° F. This aliphatic fraction serves to reduce the solvent action of the composition on the surface coating to be treated.

Equal parts by volume of the above solvent mixture and china wood oil then were combined and a sufficient amount of an appropriate oil soluble dye added.

This composition has a flash point of over 100° F., and the results of its application are substantially the same as those described in Example I.

Tests conducted with the solvent mixtures only of Examples I and II, i.e. without admixture with non-volatile liquid vehicle, resulted in substantially uncontrolled and complete stripping of the surface coating. Even with extreme care in use, blistering and peeling of the coating could not be prevented.

It will be apparent to those skilled in the art that various changes in the types and proportions of the ingredients described hereinbefore may be made without departing from the spirit of this invention and the scope of the appended claims.

Having now described my invention and the manner in which it may be used, what I claim as new and desire to secure by Letters Patent is:

1. A composition for restoring surface coatings of nitrocellulose lacquers and modified or unmodified drying oil varnishes which include and are applied from a volatile organic solvent vehicle and which harden under normal atmosphere conditions and whose hardened films are capable of being at least softened by volatile organic solvents, the composition consisting essentially of about 25 to 75 parts by volume volatile coating solvent and about 75 to 25 parts by volume non-volatile liquid vehicle for the coating solvent, in which vehicle the coating to be restored is insoluble, the coating solvent consisting essentially of a mixture of about 55 to 80 parts by volume flammable, volatile coating solvent comprising a mixture of at least two compounds selected from the class consisting of xylene, toluene, isopropyl alcohol, butyl alcohol, acetone, cellosolve, methyl cellosolve, butyl cellosolve, butyl acetate, amyl acetate, ethyl acetate, methyl ethyl ketone and methyl isobutyl ketone, and about 20 to 45 parts by volume substantially non-flammable, volatile, halogenated aliphatic liquid hydrocarbon selected from the class consisting of methyl bromide, ethyl bromide, methylene chloride, chlorethene, trichlorethylene, chloroform and carbon tetrachloride; and the vehicle being selected from the class consisting of linseed and china wood oils and petroleum base oils having a viscosity not substantially exceeding SAE 60, and mixtures thereof, the composition containing not more than 0.5% water and having a flash point exceeding 70° F.

2. The composition of claim 1 consisting essentially of about equal parts by volume volatile coating solvent and SAE 40 motor oil, the coating solvent consisting essentially in parts by volume of a mixture of about 30 parts xylene, 22 parts toluene, 7 parts butyl acetate, 7 parts ethyl acetate, 3 parts amyl acetate, about 22 parts methylene chloride, and about 9 parts chlorethene, the composition having a flash point exceeding 150° F.

3. The composition of claim 1 consisting essentially of about equal parts by volume volatile coating solvent and china wood oil, the coating solvent consisting essentially in parts by volume of a mixture of about 26 parts xylene, 19 parts toluene, 6 parts butyl acetate, 6 parts ethyl acetate, 3 parts amyl acetate, 25 parts methylene chloride, 5 parts chlorethene, and 10 parts petroleum aliphatic solvent fraction having a distillation range of from about 300 to about 350° F., the composition having a flash point exceeding 100° F.

References Cited

UNITED STATES PATENTS

| | | | |
|---|---|---|---|
| 2,077,874 | 4/1937 | Brower | 106—311 |
| 2,254,469 | 9/1941 | Bjorksten | 106—311 |
| 3,020,661 | 2/1962 | Miller et al. | 117—63 |

FOREIGN PATENTS 556,755   10/1943   Great Britain.

ALLAN LIEBERMAN, *Primary Examiner.*